United States Patent
Austad et al.

(10) Patent No.: US 8,267,031 B2
(45) Date of Patent: Sep. 18, 2012

(54) TENSION MANAGEMENT CONTROL SYSTEM AND METHODS USED WITH TOWED MARINE SENSOR ARRAYS

(75) Inventors: Martin Austad, Oslo (NO); Jan Erik Stokkeland, Heggedal (NO); Karl Petter Elvestad, Trøgstad (NO)

(73) Assignee: PGS Geophysical AS, Lysaker (NO)

( * ) Notice: Subject to any disclaimer, the term of this patent is extended or adjusted under 35 U.S.C. 154(b) by 117 days.

(21) Appl. No.: 12/660,321

(22) Filed: Feb. 24, 2010

(65) Prior Publication Data

US 2011/0203509 A1 Aug. 25, 2011

(51) Int. Cl.
*B63G 8/42* (2006.01)

(52) U.S. Cl. ............. 114/244; 114/253; 367/16; 367/20

(58) Field of Classification Search ............... 114/244, 114/245, 246, 253; 367/16, 17, 19, 20, 21
See application file for complete search history.

(56) References Cited

U.S. PATENT DOCUMENTS

| | | | |
|---|---|---|---|
| 4,481,611 A | 11/1984 | Burrage | |
| 4,574,723 A | 3/1986 | Chiles et al. | |
| 4,890,568 A | 1/1990 | Dolengowski | |
| 5,050,459 A | 9/1991 | Ishikawa et al. | |
| 6,144,342 A | 11/2000 | Bertheas et al. | |
| 6,305,308 B1 | 10/2001 | Kristiansen et al. | |
| 6,343,515 B1 | 2/2002 | Dodson | |
| 6,504,792 B2 | 1/2003 | Barker | |
| 7,156,035 B2 | 1/2007 | Hocquet et al. | |
| 7,221,619 B1 | 5/2007 | George | |
| 7,376,045 B2 | 5/2008 | Falkenberg et al. | |
| 7,404,370 B2 * | 7/2008 | Stokkeland | 114/244 |
| 7,425,186 B2 | 9/2008 | Lemberger | |
| 7,658,161 B2 | 2/2010 | Toennessen et al. | |
| 7,660,190 B2 | 2/2010 | Keskes et al. | |
| 7,738,317 B2 | 6/2010 | Toennessen | |
| 7,778,109 B2 * | 8/2010 | Storteig et al. | 367/16 |
| 2008/0008033 A1 | 1/2008 | Fossum et al. | |
| 2009/0050044 A1 | 2/2009 | Stokkeland et al. | |

FOREIGN PATENT DOCUMENTS

| | | |
|---|---|---|
| EP | 0168959 A1 | 6/1985 |
| GB | 2122562 A | 6/1983 |
| GB | 2399883 A | 9/2004 |
| GB | 2432911 | 6/2007 |
| GB | 2440636 A | 2/2008 |
| WO | WO 89/12236 | 12/1989 |
| WO | 9825162 A1 | 6/1998 |
| WO | WO 99/12055 | 3/1999 |

OTHER PUBLICATIONS

European Search Report, Date of Completion of Search: Jul. 6, 111.

* cited by examiner

*Primary Examiner* — Lars A Olson

(57) ABSTRACT

A method for towing a sensor streamer array in a body of water includes towing a plurality of sensor streamers behind a vessel in the water, measuring tension at a plurality of positions along the array and determining at least one of an optimum operating speed for the vessel, when the streamers and associated towing equipment have become affected by marine debris so as to require cleaning, and an optimum angle of attack of at least one paravane in the towing equipment.

43 Claims, 3 Drawing Sheets

TENSION MANAGEMENT CONTROL SYSTEM AND METHODS USED WITH TOWED MARINE SENSOR ARRAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine geophysical surveying. More particularly, the invention relates to methods for optimizing operating efficiency of marine surveying while maintaining safe tension levels in a towed sensor array.

2. Background Art

Marine geophysical surveying systems such as seismic acquisition systems and electromagnetic survey systems are used to acquire geophysical data from formations disposed below the bottom of a body of water, such as a lake or the ocean. Marine seismic surveying systems, for example, typically include a seismic survey vessel having onboard navigation, seismic energy source control, and geophysical data recording equipment. The seismic survey vessel is typically configured to tow one, or more typically a plurality of laterally spaced apart sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record with respect to time is made in the recording system of the signals generated by each sensor (or groups of such sensors). The recorded signals are later interpreted to infer the structure and composition of the formations below the bottom of the body of water. Corresponding components for inducing electromagnetic fields and detecting electromagnetic phenomena originating in the subsurface in response to such imparted fields may be used in marine electromagnetic geophysical survey systems.

The one or more sensor streamers are in the most general sense long cables that have geophysical sensors disposed at spaced apart positions along the length of the cables. A typical streamer can extend behind the geophysical survey vessel for several kilometers. Because of the great length of the typical streamer, the streamer may not travel entirely in a straight line behind the survey vessel at every point along its length due to interaction of the streamer with the water and currents in the water, among other factors.

U.S. Pat. No. 7,221,619 issued to George and commonly owned with the present invention describes a system for controlling deployment and operation of seismic streamers using strain gauges or other tension measuring devices distributed in certain parts of the towing equipment. The measurements from such gauges are used, for example, to determine whether the array of streamers is evenly deployed, whether excessive tension has been experienced by one or more lines or cables, and when a cable should be removed from service.

There exists a need for additional management of tension distribution throughout a marine geophysical survey array to improve operation during surveying and maneuvering, and to optimize efficiency of survey operations.

SUMMARY OF THE INVENTION

A method for towing a sensor streamer array in a body of water includes towing a plurality of sensor streamers behind a vessel in the water, measuring tension at a plurality of positions along the array and determining at least one of an optimum operating speed for the vessel, when the streamers and associated towing equipment have become affected by marine debris so as to require cleaning, and an optimum angle of attack of at least one paravane in the towing equipment.

In one implementation, tension may be estimated at various positions along the streamer array and/or where a tension measuring device has failed.

Other aspects and advantages of the invention will be apparent from the following description and the appended claims.

DETAILED DESCRIPTION

Figure 1:
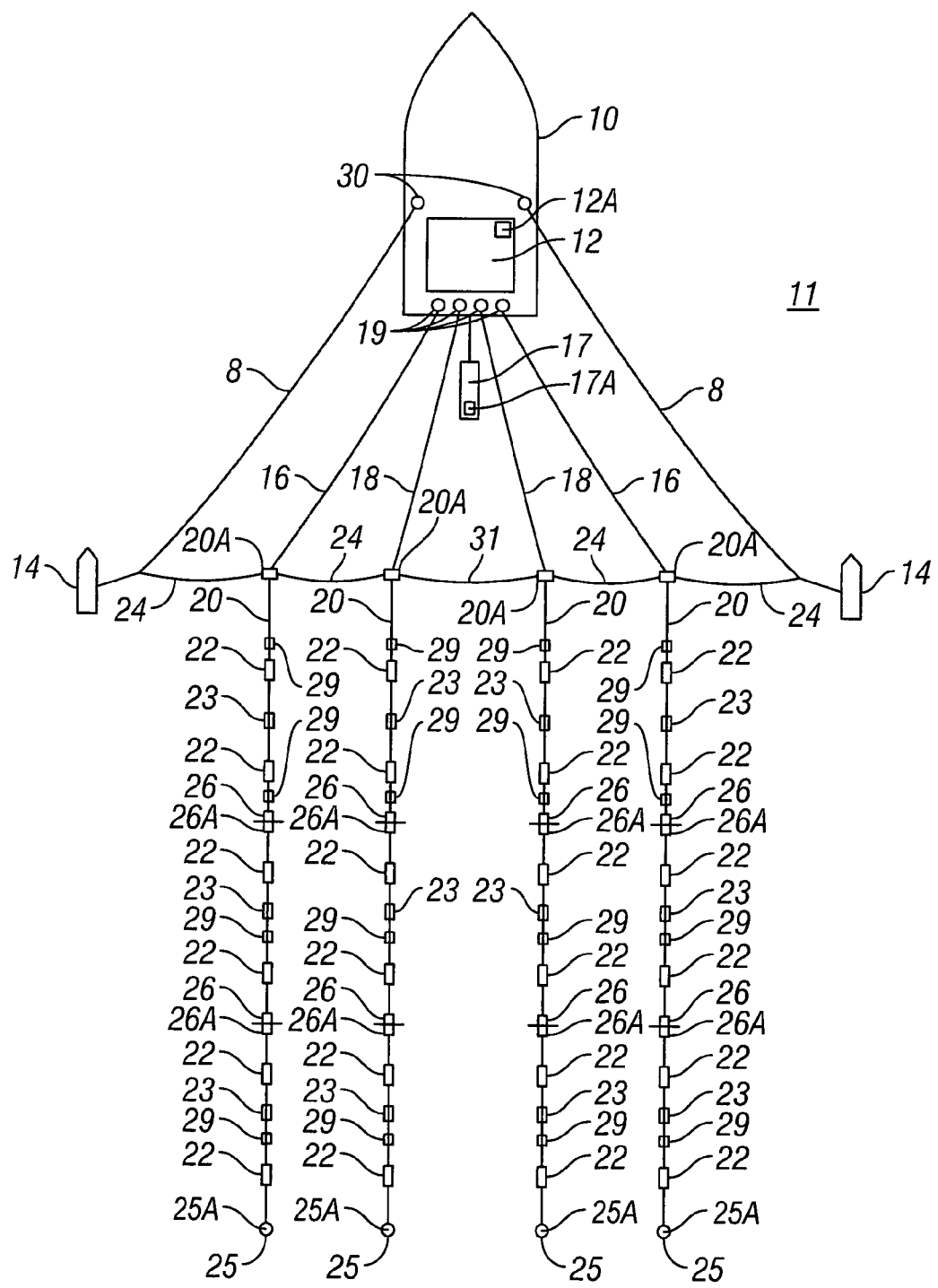
FIG. 1 shows an array of seismic streamers each including lateral force and depth control devices for adjusting geometry of the respective streamer.

FIG. 1 shows a typical marine geophysical survey system that can include a plurality of sensor streamers. Each of the sensor streamers can be guided through the water by one or more lateral force and depth ("LFD") control devices cooperatively engaged with each of the streamers. As will be explained further below, the use of LFD devices, which provide depth control capability, is a matter of choice for the system designer. It is only necessary for purposes of the invention that the devices associated with the sensor streamers provide directional control, that is, to affect the direction of the streamer parallel to the plane of the water surface as it moves through the water. Depth can optionally be controlled by such devices or by other depth control devices known in the art. The geophysical survey system includes a survey vessel 10 that moves along the surface of a body of water 11 such as a lake or the ocean. The survey vessel 10 may include thereon equipment, shown generally at 12 and for convenience collectively referred to as a "recording system." The recording system 12 typically includes devices such as a data recording unit (not shown separately) for making a record with respect to time of signals generated by various sensors in the acquisition system. The recording system 12 also typically includes navigation equipment (not shown separately) to determine and record, at selected times, the geodetic position of the vessel 10, and using other devices to be explained below, each of a plurality of geophysical sensors 22 disposed at spaced apart locations on streamers 20 towed by the survey vessel 10.

In one example, the device for determining the geodetic position may be a geodetic position signal receiver such as a global positioning satellite ("GPS") receiver, shown schematically at 12A. Other geodetic position determination devices are known in the art. The foregoing elements of the recording system 12 are familiar to those skilled in the art, and with the exception of the geodetic position detecting receiver 12A, are not shown separately in the figures herein for clarity of the illustration.

The geophysical sensors 22 can be any type of geophysical sensor known in the art. Non-limiting examples of such sensors may include particle motion-responsive seismic sensors such as geophones and accelerometers, pressure-responsive seismic sensors, pressure time gradient-responsive seismic sensors, electrodes, magnetometers, temperature sensors or combinations of the foregoing. The geophysical sensors 22 may measure, for example, seismic or electromagnetic field energy primarily reflected from or refracted by various structures in the Earth's subsurface below the bottom of the water 11 in response to energy imparted into the subsurface by an energy source 17. Seismic energy, for example, may originate from a seismic energy source, or an array of such sources, deployed in the water 11 and towed by the survey vessel 10 or by another vessel. Electromagnetic energy may be provided by passing electric current through a wire loop or electrode pair (not shown for clarity). The energy source 17 may be towed in the water 11 by the survey vessel 10 or a different vessel (not shown). The recording system 12 may also include energy source control equipment (not shown separately) for selectively operating the energy source 17.

In the survey system shown in FIG. 1, there are four sensor streamers 20 towed by the survey vessel 10. The number of sensor streamers shown in FIG. 1, however, is only for purposes of explaining certain portions of the invention and is not a limitation on the number of streamers that may be used in any particular geophysical survey system according to the invention. As explained in the Background section herein, in marine geophysical acquisition systems such as shown in FIG. 1 that include a plurality of laterally spaced apart streamers, the streamers 20 are typically coupled to towing equipment that secures the forward end of each of the streamers 20 at a selected lateral position with respect to adjacent streamers and with respect to the seismic vessel 10. As shown in FIG. 1, the towing equipment can include one or more paravane tow ropes 8 each coupled to the vessel 10 at one end through a winch 30 or similar spooling device that enables changing the deployed length of the one or more paravane tow ropes 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is typically opposed to that of the other paravane 14. The combined lateral motion component of the paravanes 14 separates the paravanes 14 from each other until they put into tension one or more spreader ropes or cables 24, and a center spreader rope 31 functionally coupled end to end between the paravanes 14. The paravanes 14 may have an adjustable angle of attack with respect to the direction of motion of the vessel 10 in the water. Non limiting examples of such "steerable" paravanes are described in U.S. Pat. No. 7,404,370 issued to Stokkeland and commonly owned with the present invention.

Other configurations may exclude the center spreader rope 31, may have paravanes on only one side of the vessel or may have two or more paravanes on each side of the vessel. Accordingly, the scope of the invention is not limited to the configuration shown in FIG. 1.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to fix the lateral positions of the streamers 20 with respect to each other and with respect to the centerline of the vessel 10. Electrical and/or optical connection between the appropriate components in the recording system 12 and, ultimately, the geophysical sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the forward end of each streamer 20. Corresponding electrical and/or optical connection between the appropriate components of the recording unit 12 and the sensors 22 in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed. The type of towing equipment coupled to the forward end of each streamer shown in FIG. 1 is only intended to illustrate a type of equipment that can tow an array of laterally spaced apart streamers in the water. Other towing structures may be used in other examples of geophysical acquisition system according to the invention.

The acquisition system shown in FIG. 1 can also include a plurality of lateral force and depth ("LFD") control devices 26 cooperatively engaged with each of the streamers 20 at selected positions along each streamer 20. Each LFD control device 26 can include one or more rotatable control surfaces (not shown separately) that when moved to a selected rotary orientation with respect to the direction of movement of such surfaces through the water 11 creates a hydrodynamic lift in a selected direction to urge the streamer 20 in any selected direction upward or downward in the water 11 or laterally along the water surface with respect to the direction of motion of the vessel 10. Thus, such LFD control devices 26 can be used to maintain the streamers in a selected geometric arrangement. A non-limiting example of LFD device that may be used in some examples is described in U.S. Patent Application Publication No. 2008/0008033 filed by Fossum et al. or U.S. Pat. No. 6,144,342 issued to Bertheas et al. The particular configuration of the LFD devices 26, however, is not a limit on the scope of the present invention. Depth control of the streamers 20 may be provided passively, such as by providing the streamers 20 with a selected overall specific gravity, or by separate depth control devices (not shown). Therefore, any reference to "depth" control as provided by the LFD devices 26 is only intended to cover the present example implementation, such as using the device shown in the Fossum et al. '033 patent application publication referred to above or the device shown in the Bertheas '342 patent. Any reference to active depth control of the streamers 20 is not a limit on the scope of the present invention. For purposes of defining the scope of the invention, therefore, the LFD devices 26 need only perform the function of "lateral force" control devices, and the inclusion of depth control as a part of the function of the LFD devices 26 explained herein is intended to ensure that those of ordinary skill in the art understand that the use of the example LFD devices 26 disclosed herein, and any other similar examples, are within the scope of the present invention.

In the present example, each LFD device 26 may include an associated position determination device. In one example, the position determination device may be an acoustic range sensing device ("ARD") 26A. Such ARDs typically include an ultrasonic transceiver or transmitter and electronic circuitry configured to cause the transceiver to emit pulses of acoustic energy. Travel time of the acoustic energy between a transmitter and a receiver disposed at a spaced apart position such as along the same streamer and/or on a different streamer, is related to the distance between the transmitter and a receiver, and the acoustic velocity of the water. The acoustic velocity can be assumed substantially not to change during a survey, or it can be measured by a device such as a water velocity test cell. Alternatively or additionally, acoustic range sensing devices ("ARDs") may be disposed at selected positions along each one of the streamers not collocated with the LFD devices 26. Such additional ARDs are shown at 23 in FIG. 1. Each of the ARDs 26A, 23 may be in signal communication with the recording system 12 such that at any moment in time the distance between any two ARDs 26A, 23 on any of the streamers 20 is determinable. One or more ARDs may be placed at selected positions proximate the aft end of the vessel 10 so that relative distances between the selected positions on the vessel 10 and any of the ARDs on the streamers may also be determined. A non-limiting example of an ARD and system used with such ARDs is described in U.S. Pat. No. 7,376,045 issued to Falkenberg et al. and commonly owned with the present invention.

The streamers 20 may additionally or alternatively include a plurality of heading sensors 29 disposed at spaced apart positions along each streamer 20. The heading sensors 29 may be geomagnetic direction sensors such as magnetic compass devices affixed to the exterior of the streamer 20. One type of compass device is described in U.S. Pat. No. 4,481,611 issued to Burrage and incorporated herein by reference. The heading sensors 29 provide a signal indicative of the heading (direction with respect to magnetic north) of the streamer 20 at the axial position of the heading sensor 29 along the respective streamer. Measurements of such heading at spaced apart locations along each streamer may be used to interpolate the geometry (spatial distribution) of each streamer.

Each streamer 20 may include at the distal end thereof a tail buoy 25. The tail buoy 25 may include, among other sensing devices, a geodetic position signal receiver 25A such as a GPS receiver that can determine the geodetic position of each tail buoy 25. The geodetic position receiver 25A in each tail buoy 25 may be in signal communication with the recording system 12.

By determining the distance between ARDs 26A, 23, including the one or more ARDs on the vessel 10, and/or by interpolating the spatial distribution of the streamers from the heading sensor 29 measurements, an estimate of the geometry of each streamer 20 may be made. Collectively, the geometry of the streamers 20 may be referred to as the "array geometry." For purposes of defining the scope of the present invention, the various position measurement components described above, including those from the heading sensors 29, from the ARDs 26A, 23, and, if used, from the additional geodetic position receivers 25A in the tail buoys 25, may be used individually or in any combination. It is only necessary for purposes of the present invention to be able to reasonably estimate the relative position of each point along each streamer 20 with reference to the survey vessel 10, or as will be further explained, with reference to the position of the energy source 17. By appropriate selection of the positions along each streamer at which the various relative position measurement devices described above are disposed, it is possible to determine the array geometry without the need to measure, estimate or otherwise determine the absolute geodetic position at large numbers of positions along each streamer, such as by using a large number of GPS receivers. The ARDs and heading sensors may be referred to for convenience in defining the invention as "relative position determination" sensors. By determining relative positions at each point along each streamer with reference to a selected point on the survey vessel or the energy source, is it possible to determine the geodetic position of each such streamer point if the geodetic position of the vessel or the energy source is determined. As explained above, the navigation portion of the recording system 12 may include a GPS receiver or any other geodetic location receiver 12A. In some examples, the energy source 17 may also include a geodetic position location receiver 17A such as a GPS receiver. A particular example of a system for determining relative positions of the streamers using acoustic signals is described in the Falkenberg et al. patent referred to above.

The foregoing description with reference to FIG. 1 is meant to provide as a relatively complete description of the components that may be used with a tension management system according to the various aspects of the invention. Accordingly, some of the navigation components may be omitted in other examples of a survey system.

Figure 1A:
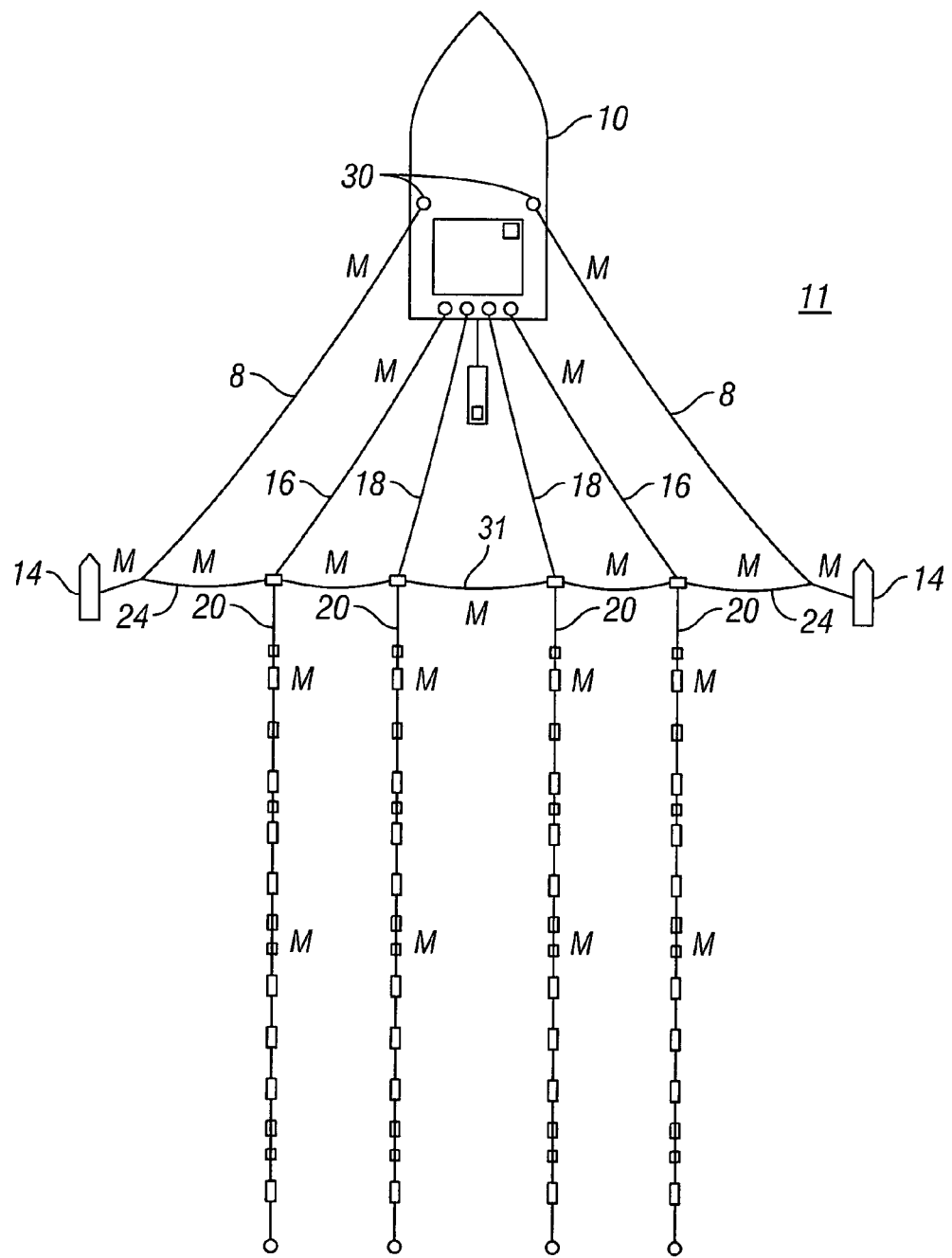
FIG. 1A shows example placements of load cells or strain gauges within various parts of the acquisition system of FIG. 1.

FIG. 1A shows an outline of a marine geophysical data acquisition system which may be substantially as explained with reference to FIG. 1. What are shown in particular FIG. 1A are example placements for strain gauges or load cells, each indicated by M. The strain gauges or load cells M may be electrical sensors, such as Wheatstone bridge type sensors, or optical sensors, such as Bragg gratings etched into an optical fiber. Optical strain gauges as applied to marine geophysical acquisition systems are well explained in U.S. Pat. No. 7,221,619 issued to George and commonly owned with the present invention. The strain gauges M may also be hydrostatic pressure sensors such as piezoelectric type sensors. The strain gauges M may be placed at selected positions along the paravane tow ropes 8, the outermost lead in cables 16, inner lead in cables 18, the spreader cables 24 and along the streamers 20. Measurements made by the strain gauges M are conducted to the recording system (12 in FIG. 1) for analysis and control. The exact positions shown in FIG. 1A and the foregoing example types of tension sensors are not intended to limit the scope of the invention.

Figure 2:
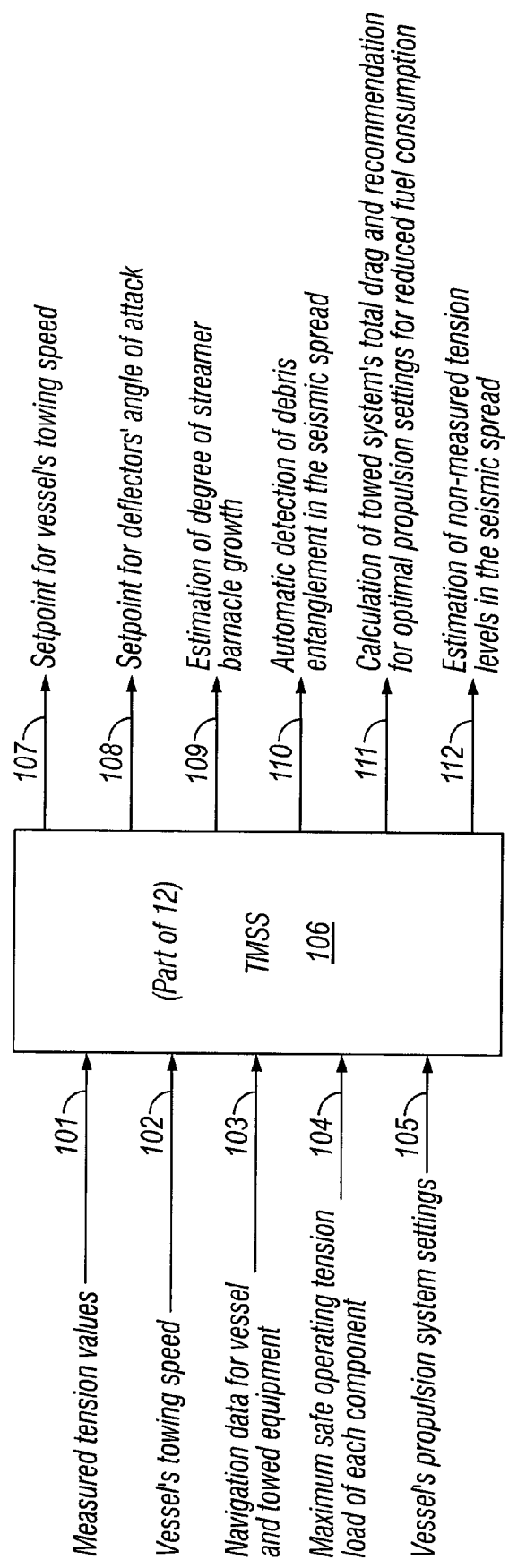
FIG. 2 shows an example tension management system and its respective input signals and output signals.

An example tension monitoring and strategy system (TMSS) is shown at 106 in FIG. 2. The TMSS 106 may form part of the recording system (12 in FIG. 1) or may be operated on one or more separate computers. The TMSS 106 may accept as input the measured tension or strain from each of the stain gauges (M in FIG. 1A), the vessel's speed 102, the geodetic and/or relative position 103 of each device from the navigation and position determination elements described with reference to FIG. 1, maximum safe operating tension load 104 for each device on which tension is measured, and the vessel's propulsion settings (e.g., propulsion engine speed and torque, and propeller pitch if such is adjustable on the vessel), angle and speed of thrusters if such are used on the vessel, or the angle of steering rudder(s) if such are present and the steering angle ["angle of attack"] of each paravanes 14. Using the foregoing inputs the TMSS 106 can automatically generate and transmit the outputs described below to appropriate systems and/or locations onboard the vessel (10 in FIG. 1).

In one implementation, a calculated maximum safe vessel speed or optimum vessel speed can be presented to a visual display (e.g., computer display such as an LCD display) for the navigator's evaluation, or alternatively, a control signal can be generated and transmitted directly to the vessel's speed control system. The present towing speed 102, the maximum safe operating tension of all the towed system components 104 and the actual measured tensions 101 are conducted to the TMSS 106, which calculates the optimal or maximum towing speed 107.

A calculated optimal paravane angle of attack 108 can also be presented to a display for the navigator's evaluation, or alternatively it is sent directly to the vessel's deflector steering system (DSS) to adjust the angle of attack of one or both paravanes (14 in FIG. 1). The optimal paravane angle of attack 108 will enable an optimal towing speed while the tension generated by the paravanes (14 in FIG. 1) is maintained at a safe level with respect to the lines connected thereto. The foregoing may be especially important during vessel turns. In a turn, the TMSS 106 may calculate a reduced outer (with respect to the turn) paravane angle of attack. In response, the TMSS 106 may calculate a higher optimal towing speed 107. Inputs of vessel speed 102, measured tension 101 and maximum safe operating tension of the components 104 may be input so that the TMSS 106 can calculate the increase or decrease in paravane angle of attack 108.

The streamers' tension 101 can be measured right after deployment of the vessel relative to the vessel's towing speed 102, generally when traveling in a straight course. Over time, as the various components of the deployed streamer array become encrusted with barnacles and other marine debris, the relationship between measured tension and vessel speed will change. The TMSS 106 may generate and indicator or other warning signal that the tension relative to the vessel speed has increased above a safe threshold during the seismic survey. The system operator may decide at such point to retrieve or clean the affected devices deployed in the water.

Another output of the TMSS 106 is shown at 110 in FIG. 2 and may include an alarm for sudden entanglement of any part of the equipment deployed in the water. The TMSS 106 may be programmed to distinguish between entanglement and build up of debris over time by the rate of increase of tension measurements, and their spatial distribution within the towed equipment in the water. For purposes of this description, the term "debris" is used to mean any foreign matter that becomes entangled with or attached to the survey equipment deployed in the water.

The TMSS 106 may also be programmed to model tension distribution throughout the deployed equipment in the water. The model may accept as input the measured tension values, speed of the vessel and the operating parameters of any of the deployed steering devices. The output at 112 may include estimates or calculations of tension for those locations which do not have an actual load cell or sensor. The output may also provide estimates of tension for the location of any one or more of the load cells that fail.

A calculation of the towed system's total drag is derived from all tension values and can be verified against the vessel's propulsion system settings over time to determine the most efficient propulsion system settings.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for towing a sensor streamer array in a body of water, comprising:
towing a plurality of sensor streamers behind a vessel in the water;
measuring tension at a plurality of positions along the array to produce measured tension values;
responsive to at least some of the measured tension values, determining a setpoint operating speed for the vessel;
responsive to at least some of the measured tension values, determining when the streamers and associated towing equipment have become affected by marine debris so as to require cleaning; and
responsive to at least some of the measured tension values, determining a setpoint angle of attack of at least one paravane in the towing equipment.

2. The method of claim 1 wherein the setpoint operating speed is determined over a selected length of time, and determining vessel propulsion system settings therefrom.

3. The method of claim 1 further comprising determining the setpoint angle of attack during turning the vessel, and redetermining the setpoint operating speed of the vessel while turning.

4. The method of claim 1 wherein the determining the setpoint operating speed includes determining whether a safe tension on each streamer and each component of the towing equipment has been exceeded.

5. The method of claim 1 further comprising determining when the streamers and associated towing equipment have become entangled based on rate of increase of tension.

6. The method of claim 1 further comprising using the measured tension to estimate tension values at least one other point in the sensor streamer array and associated towing equipment.

7. The method of claim 6 wherein the at least one other point comprises a location of a tension sensor.

8. The method of claim 6 further comprising using the measured tension to estimate tension values distribution throughout the streamer array and associated towing equipment.

9. A marine survey system comprising:
a survey vessel;
a first paravane and a second paravane coupled by a spreader line, each paravane configured to have an adjustable angle of attack;
a plurality of sensor streamers coupled to the spreader line;
a tension measurement device associated with a sensor streamer;
a computer system associated with the survey vessel, the computer system communicatively coupled to the tension measurement device, the computer system configured to:
calculate a desired operating speed for the survey vessel based on an indication of tension from the tension measurement device;
generate an indicator of streamer barnacle growth based on an indication of tension from the tension measurement device; and
determine desired angles of attack for the first and second paravanes.

10. The marine survey system of claim 9 further comprising:
a plurality of heading sensors disposed at spaced apart positions along each sensor streamer, each heading sensor configured to provide an indication of heading of the respective sensor streamer at the location of the heading sensor; and
wherein the computer system is configured to determine spatial distribution of the plurality of sensor streamers based on the data from the heading sensors.

11. The marine survey system of claim 10 further comprising:

a plurality of tail buoys coupled one each to a distal end of each of the plural sensor streamers, each tail buoy comprising a geodetic position signal receiver communicatively coupled to the computer system; and wherein when the computer system determines the spatial distribution of the plurality of sensor streamers, the computer system is further configured to determine the spatial distribution using position data derived from the geodetic position signal receivers.

12. The marine survey system of claim 10 further comprising:

an energy source device in operational relationship to the plurality of sensor streamers, the energy source device also comprising a position location receiver communicatively coupled to the computer system; and wherein when the computer system determines the spatial distribution of the plurality of sensor streamers, the computer system is further configured to determine the spatial distribution referenced to position of the energy source.

13. The marine survey system of claim 9 wherein the computer system is further configured to re-determine the angles of attack and re-determine the desired operating speed during a turn of the survey vessel.

14. The marine survey system of claim 9 wherein the computer system is further configured to determine whether one or more of the plural sensor streamers have become entangled based on rate of change of an indication of measured tension.

15. The marine survey system of claim 9 wherein the computer system is further configured to model tension in at least one component of the survey system at a location that does not have a tension measurement device.

16. A method comprising:

towing a sensor streamer array in a body of water using a survey vessel, the sensor streamer comprising a first paravane coupled to a second paravane by way of a spreader line, the paravanes providing lateral tension on the spreader line;

measuring tension at a plurality of locations within the sensor streamer array to produce measured tension values;

generating an indication of a desired operating speed of the survey vessel based in part on the measured tension values;

generating an indication of a desired angles of attack for the first and second paravanes;

measuring a plurality of headings at a plurality of locations within the sensor streamer array; and calculating a spatial distribution of the sensor streamer array based on the plurality of headings.

17. The method of claim 16 further comprising determining when at least a portion of the sensor streamer array has become affected by marine debris so as to require cleaning.

18. The method of claim 16 further comprising:

reading a geodetic location of a tail buoy coupled to at least one sensor streamer in the sensor streamer array; and wherein calculating the spatial distribution of the sensor streamer array is based at least in part on the geodetic location of the tail buoy.

19. The method of claim 16 wherein calculating the spatial distribution of the sensor streamer further comprises calculating the spatial distribution of the sensor streamer relative to a source of energy used to interrogate a formation disposed below a body of water.

20. The method of claim 16 wherein measuring tension, generating an indication of the desired operation speed, and generating an indication of the desired angles of attack occur during turning of the sensor streamer array by the survey vessel.

21. The method of claim 16 further comprising determining entanglement of portions of the sensor streamer array based on rate of change of one or more of the measured tension values.

22. The method of claim 16 further comprising modeling tension in at least one portion of the sensor streamer array that does not have a tension measurement device.

23. A method comprising:

towing a sensor streamer array in a body of water using a survey vessel, the sensor streamer comprising a first paravane coupled to a second paravane by way of a spreader line, the paravanes providing lateral tension on the spreader line;

measuring tension at a plurality of locations within the sensor streamer array to produce measured tension values;

generating an indication of a desired operating speed of the survey vessel based in part on the measured tension values;

generating an indication of a desired angles of attack for the first and second paravanes; and modeling tension in at least one portion of the sensor streamer array that does not have a tension measurement device.

24. The method of claim 23 further comprising determining entanglement of portions of the sensor streamer array based on rate of change of one or more of the measured tension values.

25. The method of claim 23 wherein measuring tension, generating an indication of the desired operation speed, and generating an indication of the desired angles of attack occur during turning of the sensor streamer array by the survey vessel.

26. The method of claim 23 further comprising determining when at least a portion of the sensor streamer array has become affected by marine debris so as to require cleaning.

27. The method of claim 23 further comprising measuring a plurality of headings at a plurality of locations within the sensor streamer array; and calculating a spatial distribution of the sensor streamer array based on the plurality of headings.

28. The method of claim 27 further comprising reading a geodetic location of a tail buoy coupled to at least one sensor streamer in the sensor streamer array, and wherein calculating the spatial distribution of the sensor streamer array is based at least in part on the geodetic location of the tail buoy.

29. The method of claim 27 wherein calculating the spatial distribution of the sensor streamer further comprises calculating the spatial distribution of the sensor streamer relative to a source of energy used to interrogate a formation disposed below a body of water.

30. The method of claim 23 wherein measuring tension, generating an indication of the desired operation speed, and generating an indication of the desired angles of attack occur during turning of the sensor streamer array by the survey vessel.

31. A method comprising:

towing a sensor streamer array in a body of water using a survey vessel, the sensor streamer comprising a first paravane coupled to a second paravane by way of a spreader line, the paravanes providing lateral tension on the spreader line;

measuring tension at a plurality of locations within the sensor streamer array to produce measured tension values;

generating an indication of a desired operating speed of the survey vessel based in part on the measured tension values;

generating an indication of a desired angles of attack for the first and second paravanes; and determining entanglement of portions of the sensor streamer array based on rate of change of one or more of the measured tension values.

32. The method of claim 31 further comprising determining when at least a portion of the sensor streamer array has become affected by marine debris so as to require cleaning.

33. The method of claim 31 further comprising measuring a plurality of headings at a plurality of locations within the sensor streamer array; and calculating a spatial distribution of the sensor streamer array based on the plurality of headings.

34. The method of claim 33 further comprising reading a geodetic location of a tail buoy coupled to at least one sensor streamer in the sensor streamer array, and wherein calculating the spatial distribution of the sensor streamer array is based at least in part on the geodetic location of the tail buoy.

35. The method of claim 33 wherein calculating the spatial distribution of the sensor streamer further comprises calculating the spatial distribution of the sensor streamer relative to a source of energy used to interrogate a formation disposed below a body of water.

36. The method of claim 31 wherein measuring tension, generating an indication of the desired operation speed, and generating an indication of the desired angles of attack occur during turning of the sensor streamer array by the survey vessel.

37. The method of claim 31 further comprising modeling tension in at least one portion of the sensor streamer array that does not have a tension measurement device.

38. A method comprising:
towing a sensor streamer array in a body of water using a survey vessel, the sensor streamer comprising a first paravane coupled to a second paravane by way of a spreader line, the paravanes providing lateral tension on the spreader line;

measuring tension at a plurality of locations within the sensor streamer array to produce measured tension values;

generating an indication of a desired operating speed of the survey vessel based in part on the measured tension values;

generating an indication of a desired angles of attack for the first and second paravanes; and determining when at least a portion of the sensor streamer array has become affected by marine debris so as to require cleaning.

39. The method of claim 37 further comprising:
reading a geodetic location of a tail buoy coupled to at least one sensor streamer in the sensor streamer array; and wherein calculating the spatial distribution of the sensor streamer array is based at least in part on the geodetic location of the tail buoy.

40. The method of claim 38 wherein calculating the spatial distribution of the sensor streamer further comprises calculating the spatial distribution of the sensor streamer relative to a source of energy used to interrogate a formation disposed below a body of water.

41. The method of claim 37 wherein measuring tension, generating an indication of the desired operation speed, and generating an indication of the desired angles of attack occur during turning of the sensor streamer array by the survey vessel.

42. The method of claim 37 further comprising determining entanglement of portions of the sensor streamer array based on rate of change of one or more of the measured tension values.

43. The method of claim 37 further comprising modeling tension in at least one portion of the sensor streamer array that does not have a tension measurement device.

* * * * *